United States Patent
Mizoguchi

(10) Patent No.: US 10,889,296 B2
(45) Date of Patent: Jan. 12, 2021

(54) VEHICLE TRAVELING CONTROL APPARATUS

(71) Applicant: SUBARU CORPORATION, Tokyo (JP)

(72) Inventor: Masato Mizoguchi, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 16/374,141

(22) Filed: Apr. 3, 2019

(65) Prior Publication Data

US 2019/0375405 A1    Dec. 12, 2019

(30) Foreign Application Priority Data

Jun. 8, 2018    (JP) .................................. 2018-110501

(51) Int. Cl.
*B60W 30/14*    (2006.01)

(52) U.S. Cl.
CPC ....... *B60W 30/143* (2013.01); *B60W 2520/10* (2013.01); *B60W 2520/14* (2013.01); *B60W 2556/50* (2020.02)

(58) Field of Classification Search
None
See application file for complete search history.

(56) References Cited

U.S. PATENT DOCUMENTS

| | | | |
|---|---|---|---|
| 8,150,581 B2* | 4/2012 | Iwazaki | B62D 1/28 701/42 |
| 9,327,764 B2* | 5/2016 | Limpibunterng | B62D 6/04 |
| 9,597,960 B2* | 3/2017 | Okuda | G08G 1/167 |
| 2009/0048738 A1* | 2/2009 | Iwazaki | B62D 15/025 701/44 |
| 2009/0194350 A1* | 8/2009 | Rattapon | B62D 1/286 180/169 |
| 2010/0211270 A1* | 8/2010 | Chin | B62D 6/007 701/44 |

(Continued)

FOREIGN PATENT DOCUMENTS

| | | |
|---|---|---|
| JP | 2003-327012 A | 11/2003 |
| JP | 2003327012 A * | 11/2003 |

(Continued)

OTHER PUBLICATIONS

Japanese Notice of Reasons for Refusal issued in corresponding Japanese Patent Application No. 2018-110501, dated Jan. 28, 2020, with English translation.

*Primary Examiner* — Shelley Chen
(74) *Attorney, Agent, or Firm* — McDermott Will & Emery LLP

(57) ABSTRACT

A vehicle traveling control apparatus includes a traveling state detector and a target value setter. The traveling state detector detects a traveling state of an own vehicle when the own vehicle traveling in a curve zone and decelerated to a curve-traveling speed approaches an exit of the curve zone. The curve traveling speed is a speed at which the own vehicle is to travel in the curve zone. The target value setter determines a target value of a vehicle speed control. The vehicle speed control starts to accelerate the own vehicle when the own vehicle approaches the exit of the curve zone. The target value is determined on the basis of the traveling state.

13 Claims, 5 Drawing Sheets

(56) References Cited

U.S. PATENT DOCUMENTS

| | | | |
|---|---|---|---|
| 2011/0015850 A1* | 1/2011 | Tange | B62D 15/025 |
| | | | 701/116 |
| 2012/0197496 A1* | 8/2012 | Limpibunterng | B62D 15/025 |
| | | | 701/42 |
| 2015/0039186 A1* | 2/2015 | Okuda | G08G 1/167 |
| | | | 701/41 |
| 2015/0166063 A1* | 6/2015 | Ishihara | B60W 60/0051 |
| | | | 701/41 |
| 2017/0282927 A1* | 10/2017 | Isaji | G05D 1/0276 |

FOREIGN PATENT DOCUMENTS

| | | | |
|---|---|---|---|
| JP | 2004-171496 A | | 6/2004 |
| JP | 2005-157754 A | | 6/2005 |
| JP | 2005-263215 A | | 9/2005 |
| JP | 2008-195226 A | | 8/2008 |
| JP | 2008195226 A | * | 8/2008 |
| JP | 2015-116919 A | | 6/2015 |

\* cited by examiner

VEHICLE TRAVELING CONTROL APPARATUS

CROSS-REFERENCE TO RELATED APPLICATIONS

The present application claims priority from Japanese Patent Application No. 2018-110501 filed on Jun. 8, 2018, the entire contents of which are hereby incorporated by reference.

BACKGROUND

The technology relates to a vehicle traveling control apparatus that controls traveling of a vehicle.

Drive assist technologies including a self-driving technique have been recently developed that cause an own vehicle, such as an automobile, to travel along a target traveling course. When detecting a curve zone in front of the own vehicle traveling along the target traveling course, for example, some of the drive assist technologies cause the own vehicle to travel through the curve zone at an appropriate curve-traveling speed. This prevents or suppresses a feeling of strangeness of a driver.

For example, Japanese Unexamined Patent Application Publication (JP-A) No. 2005-263215 discloses a deceleration control apparatus that performs a deceleration control on the basis of turn traveling of a vehicle. The deceleration control apparatus lessens the deceleration control at an exit of a curve zone to prevent or suppress a feeling of strangeness of a driver caused by the deceleration control performed in the curve zone.

SUMMARY

An aspect of the technology provides a vehicle traveling control apparatus including: a traveling state detector configured to detect a traveling state of an own vehicle when the own vehicle traveling in a curve zone and decelerated to a curve-traveling speed approaches an exit of the curve zone, the curve-traveling speed being a speed at which the own vehicle is to travel in the curve zone; and a target value setter configured to determine a target value of a vehicle speed control, the vehicle speed control starting to accelerate the own vehicle when the own vehicle approaches the exit of the curve zone, the target value being determined on a basis of the traveling state.

An aspect of the technology provides A vehicle traveling control apparatus including circuitry configured to: detect a traveling state of an own vehicle when the own vehicle traveling in a curve zone and decelerated to a curve-traveling speed approaches an exit of the curve zone, the curve-traveling speed being a speed at which the own vehicle is to travel in the curve zone; and determine a target value of a vehicle speed control, the vehicle speed control starting to accelerate the own vehicle when the own vehicle approaches the exit of the curve zone, the target value being determined on a basis of the traveling state.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

In the following, some embodiments of the technology are described with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

With an ordinary technique including the technique described in JP-A No. 2005-263215, when an own vehicle approaching an exit of a curve zone is accelerated to recover a set vehicle speed set before entering the curve zone, the own vehicle can exhibit an unstable behavior due to factors, such as crosswind or a transverse gradient of a road. Such an unstable behavior of the own vehicle can lower a performance of the own vehicle to follow a target traveling course. This can hinder determination of an appropriate target value of the vehicle speed control that accelerates the own vehicle to recover the set vehicle speed in accordance with the behavior of the own vehicle, which can in turn cause a feeling of strangeness of a driver.

It is desirable to provide a traveling control apparatus that makes it possible to recover a vehicle speed after decelerating in the curve zone without causing a feeling of strangeness of a driver.

Figure 1:
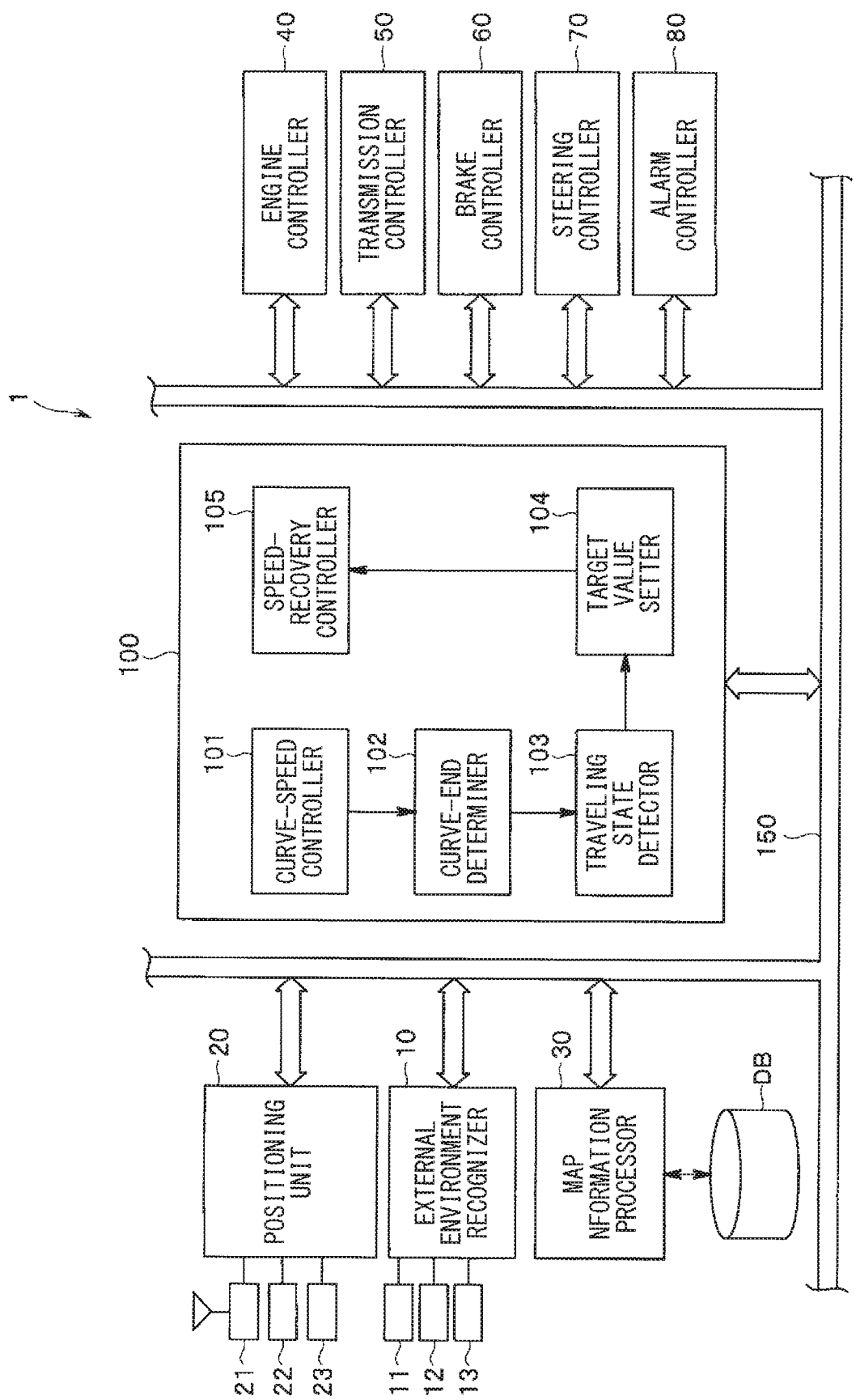
FIG. 1 is a block diagram illustrating an example traveling control system that includes a traveling control apparatus according to one example embodiment of the technology.

FIG. 1 illustrates an example configuration of a traveling control system 1 that includes a traveling control apparatus 100 according to an example embodiment of the technology. The traveling control system 1 may perform a traveling control including autonomous self-driving of a vehicle. The traveling control system 1 may include the traveling control apparatus 100, an external environment recognizer 10, a positioning unit 20, a map information processor 30, an engine controller 40, a transmission controller 50, a brake controller 60, a steering controller 70, and an alarm controller 80 that are coupled to one another via a communication bus 150 to form a network.

The external environment recognizer 10 may include various devices that recognize an external environment and various sensors that detect conditions of the external environment in which the own vehicle is traveling. Specific but non-limiting examples of the devices that recognize the external environment may include a vehicle-mounted camera unit 11 and a radar unit 12. The radar unit 12 may include a millimeter-wave radar or Lidar, for example. Specific but non-limiting examples of the sensors that detect the conditions of the external environment may include an outside air temperature sensor 13 that detects an outside air temperature, which is one of weather conditions of the exterior environment. The external environment recognizer 10 may recognize the external environment outside the own vehicle on the basis of detection information, environment information, traffic information, position information, and map information. The detection information may indicate an object detected around the own vehicle by the camera unit 11 or the radar unit 12, for example. The environment information may indicate an outside air temperature detected by the outside air temperature sensor 13, for example. The traffic information may be obtained by a communication infrastructure such as road-to-vehicle communication or vehicle-to-vehicle communication. The position information may indicate a position of the own vehicle measured by the positioning unit 20. The map information may be transmitted from the map information processor 30.

In an example, the camera unit 11 may be mounted with a stereo camera that includes two cameras. The two cameras may capture respective images of the same target object from different viewing points. The external environment recognizer 10 may perform a stereo image process of the paired images (i.e., right and left images) captured with the stereo camera to achieve three-dimensional recognition of the external environment. For example, the stereo camera of the camera unit 11 may include two color cameras the shutter timing of which are synchronized. The two color cameras may be disposed in the vicinity of a rearview mirror that is disposed on an inner side of a windshield at an upper interior portion of the own vehicle. The two color cameras may be respectively disposed on right and left sides of the rear view mirror at a predetermined base length along the width of the own vehicle. The two color cameras may each include an imaging device, such as a charge coupled device (CCD) or a complementary metal oxide semiconductor (CMOS) device, for example.

The external environment recognizer 10 may perform matching between the paired right and left images captured with the stereo camera of the camera unit 11. The external environment recognizer 10 may determine a pixel shift or parallax between one point of the right image and a corresponding point of the left image. The pixel shift may be converted into luminance data, such as pixel data, to generate a distance image. Points on the distance image may be converted into points on a three-dimensional coordinate system having an X-axis along the width (i.e., lateral length) of the own vehicle, a Y-axis along the height of the own vehicle, and a Z-axis along the length of the own vehicle (i.e., along a distance direction or a depth direction), using the principle of triangulation. This allows for three-dimensional recognition of objects in the image captured with the camera unit 11. Specific but non-limiting examples of the objects on the road on which the own vehicle is traveling may include a lane line or a lane mark, an obstacle, and a preceding vehicle traveling ahead of the own vehicle.

The lane line or the lane mark may be recognized by extracting a group of candidate points of the lane line from the image, and deriving a straight or curve line that connects the candidate points. For example, the external environment recognizer 10 may detect, in a lane-line detection region of the image, edges at which luminance (i.e., pixel value) changes greater than a predetermined level. The detection of the edges may be performed along multiple horizontal search lines that extend along the width of the own vehicle. The external environment recognizer 10 may thereby determine a start point and an end point of the lane line in pair, for each of the search lines. Thereafter, the external environment recognizer 10 may extract a region between the start point and the end point as a candidate point of the lane line.

Thereafter, the external environment recognizer 10 may generate approximate models of right and left lane lines by processing time-series data on the candidate points of the lane lines in a spatial coordinate system. The time-series data may be based on a displacement of the own vehicle per unit time. The external environment recognizer 10 may recognize the lane lines on the basis of the generated approximate models of the lane lines. The approximate models of the lane lines may be generated by connecting straight line components obtained through the Hough transform or approximating into a curve of a quadratic equation, for example.

The positioning unit 20 may detect a position of the own vehicle mainly on the basis of signals from a plurality of navigation satellites of a global positioning system (GPS), for example. In a condition where the precision of the position detection decreases in precision due to influences of factors, such as trapping of signals or radio waves from the satellites or a multipath generated by reflection of the radio wave, the positioning unit 20 may detect the position of the own vehicle through autonomous navigation in combination with the satellite navigation. The autonomous navigation may use a vehicle-mounted sensor, such as a gyro sensor 22 or a speed sensor 23.

In a case of the positioning by means of the satellite navigation, the positioning unit 20 may receive signals that include information on trajectories, times, and other pieces of data from the navigation satellites through the receiver 21. On the basis of the signals received, the positioning unit 20 may detect an absolute position of the own vehicle that includes information on a latitude, a longitude, an altitude, and a time. In a case of positioning by means of the autonomous navigation, the positioning unit 20 may detect, as the position of the own vehicle, a relative positional displacement of the own vehicle on the basis of a traveling distance of the own vehicle. The traveling distance of the own vehicle may be calculated from a traveling azimuth of the own vehicle detected by the gyro sensor 22 and a vehicle speed pulse transmitted from the speed sensor 23, for example.

Optionally, the positioning unit 20 may be integrated with a communication unit that acquires traffic information using a communication infrastructure such as a road-to-vehicle communication or a vehicle-to-vehicle communication.

The map information processor 30 may include a map database DB. The map information processor 30 may identify the position of the own vehicle on the map data stored in the map database DB on the basis of the information on the position of the own vehicle detected by the positioning unit 20, and may output data on the identified position of the own vehicle. The map database DB may store navigation map data and traveling control map data, for example. The traveling control map data may have a higher definition than the navigation map data. With reference to the navigation map data, traveling route assistance for the own vehicle and a current position of the own vehicle may be displayed, for example. With reference to the traveling control map data, a drive assist control including self-driving may be performed, for example.

In the navigation map data, a current node may be coupled to a preceding node via one link, and the current node may also be coupled to a subsequent node via another link. Each of the links may store corresponding information on traffic lights, road signs, and buildings on the road, for example. In the high-definition traveling control map data, multiple data points are provided between any node and its subsequent node. Each of the data points of the traveling control map data may store road feature data and traveling control data, for example. The road feature data may include a curvature, width, and a road shoulder width of each lane of the road on which the own vehicle is traveling, for example. The traveling control data may include an azimuth angle of the road, a type of the lane line, and the number of lanes, for example. The road feature data and the traveling control data may be stored together with respective attribute data. The attribute data may indicate reliability and an update date of the corresponding data, for example.

The map information processor 30 may match the detected position of the own vehicle and the map data to cause a non-illustrated display to offer the driver the traveling route assistance and traffic information based on the result of the matching. The map information processor 30 may also transmit, through the communication bus 150, the road feature data that includes a curvature, a lane width, and a road shoulder width of the road on which the own vehicle is traveling, and the traveling control data that includes an azimuth angle of the road, a type of a lane line, and the number of lanes. Note that the traveling control data may be mainly transmitted to the traveling control apparatus 100. Optionally, the traveling control data may be transmitted to another controller.

The map information processor 30 may further perform maintenance of the map database DB. The map information processor 30 may check the nodes, links, and data points in the map database DB to keep the map database DB up to date. Additionally, the map information processor 30 may create and add new data on a region that has not been stored in the map database DB to develop the map database DB. The update of the map database DB and the addition of new data to the map database DB may be performed through matching between the position data detected by the positioning unit 20 and the data stored in the map database DB.

The engine controller 40 may control an operating state of a non-illustrated engine on the basis of signals transmitted from various sensors that detect the operating state of the engine, and various pieces of control information transmitted through the communication bus 150. For example, the engine controller 40 may perform engine control that includes fuel injection control, ignition timing control, and valve opening control of an electronic throttle valve, on the basis of an intake air mass, a throttle opening, an engine water temperature, an intake air temperature, an air-fuel ratio, a crank angle, an accelerator position, and other pieces of information on the own vehicle.

The transmission controller 50 may regulate a hydraulic pressure to be applied to a non-illustrated automatic transmission on the basis of signals transmitted from sensors that detect a shift position and a vehicle speed, and various control data transmitted through the communication bus 150, for example. The transmission controller 50 may thereby control the automatic transmission in accordance with a predetermined transmission characteristic.

The brake controller 60 may control a non-illustrated four-wheel brake on the basis of a brake switch, a speed of the four wheels, an angle of the steering wheel, a yaw rate, and other pieces of information on the own vehicle, for example. The four-wheel brake may be controlled independently from a brake operation by the driver. Additionally, the brake controller 60 may calculate a brake hydraulic pressure of each of the wheels on the basis of a brake force of each of the wheels to achieve an anti-lock brake system and an antiskid control, for example.

The steering controller 70 may control a steering torque of a non-illustrated electronic power steering motor in a steering system on the basis of a vehicle speed, a steering torque exerted by the driver's operation, a steering wheel angle, a yaw rate, and other pieces of vehicle information, for example. The steering torque may be controlled by regulating an electric current flowing into the electronic power steering motor so that a target steering torque is achieved to match an actual steering angle to a target steering angle. When an override is not requested by a steering operation by the driver, the steering torque may be controlled by regulating a driving current flowing into the electronic power steering motor through proportional integral differential (PID) control, for example.

The alarm controller 80 may control an output of an alarm for calling the driver's attention to malfunctions caused in various components of the vehicle. The alarm controller 80 may also control an output of various information to be offered to the driver. For example, the alarm controller 80 may offer the alarm and the information by means of one or both of a visual output and an auditory output. The visual output may be performed with a monitor, a display, or an alarm light, for example. The auditory output may be performed with a speaker or a buzzer, for example. While a drive assist control including self-driving is being executed, the alarm controller 80 may notify the driver of the condition of the drive assist control. When the drive assist control including self-driving is interrupted by an operation by the driver, the alarm controller 80 may notify the driver of a driving condition at the timing of the interruption.

Now described is the traveling control apparatus 100 included in the traveling control system 1. When the driver operates a non-illustrated input unit, such as a switch or a panel, to select a traveling mode that allows for self-driving or driving assistance, the traveling control apparatus 100 may determine a target traveling course on which the own vehicle is to travel, on the basis of the external environment information recognized by the external environment recognizer 10 and the information transmitted from the positioning unit 20 and the map information processor 30. Thereafter, the traveling control apparatus 100 may cause the engine controller 40, the transmission controller 50, the brake controller 60, and the steering controller 70 to perform a traveling control that causes the own vehicle to automatically travel along the target traveling course at a set vehicle speed set by the driver.

In the traveling control that causes the own vehicle to travel along the target traveling course, when the traveling control apparatus 100 recognizes a curve zone in front of the own vehicle traveling along the target traveling course at the set vehicle speed set by the driver and determines that the set vehicle speed of the own vehicle is higher than an appropriate curve-traveling speed, the traveling control apparatus 100 performs a vehicle speed control that decelerates the own vehicle traveling at the set vehicle speed to the appropriate curve-traveling speed (hereinafter also referred to as "curve-speed control") before the own vehicle enters the curve zone. Thereafter, the traveling control apparatus 100 determines a target value of a vehicle speed control that starts to accelerate the own vehicle to the set vehicle speed when the own vehicle traveling in the curve zone approaches the exit of the curve zone. The target value may be determined on the basis of the traveling state of the own vehicle.

To achieve these vehicle speed controls for the curve zone, the traveling control apparatus 100 may include a curve-speed controller 101, a curve-end determiner 102, a traveling state detector 103, a target value setter 104, and a speed-recovery controller 105. In this example embodiment, when the own vehicle traveling at the appropriate curve-traveling speed in the curve zone approaches the exit of the curve zone, the traveling control apparatus 100 may cause the curve-speed controller 101, the curve-end determiner 102, the traveling state detector 103, the target value setter 104, and the speed-recovery controller 105 to detect the traveling state of the own vehicle, determine a target value of the vehicle speed control that accelerates the own vehicle on the basis of the detected traveling state, and thereafter execute a speed-recovery control.

For example, when the traveling control apparatus 100 determines that a curve zone is present in front of the own vehicle on the basis of the information from the positioning unit 20 and the map information processor 30, the curve-speed controller 101 may calculate a curve-traveling speed Vcv for safe traveling in the curve zone. For example, the curve-speed controller 101 may calculate a target vehicle speed on the basis of the radius of curvature of the curve zone, the width of the lane, and the gradient of the road, for example. The target vehicle speed may correspond to the curve-traveling speed Vcv that appropriately meets the road conditions including the curve curvature. Traveling at such a target vehicle speed causes lateral acceleration that secures running stability and prevents the driver from feeling uncomfortable.

The curve-speed controller 101 may further compare a current vehicle speed or the set vehicle speed Vset with the curve-traveling speed Vcv, and may determine whether the own vehicle needs to be decelerated before entering the curve zone. When the set vehicle speed Vset is not higher than the curve-traveling speed Vcv (Vcv≥Vset), the curve-speed controller 101 may determine that the own vehicle is able to run through the curve zone safely at the set vehicle speed Vset, and keep the set vehicle speed Vset of the own vehicle. This causes the own vehicle to keep running in the curve zone at the set vehicle speed Vset. In contrast, when the set vehicle speed Vset is higher than the curve-traveling speed Vcv (Vcv<Vset), the curve-speed controller 101 may determine that the own vehicle needs to be decelerated before entering the curve zone, and decelerate the own vehicle to the curve-traveling speed Vcv.

When the own vehicle approaches the exit of the curve zone, the curve-end determiner 102 determines whether the curve-speed control that decelerates the own vehicle has been stopped, and whether the own vehicle has reached a position at which the speed-recovery control that recovers the set vehicle speed Vset set before the own vehicle enters the curve zone is able to start. The position at which the speed-recovery control is to able to start (hereinafter referred to as "start position of the speed-recovery control") or the position at which the curve-speed control is to be stopped (hereinafter referred to as "stop position of the curve-speed control") may be respectively represented as a distance from the exit of the curve zone (i.e., end of the curve). The distance may be determined on the basis of a difference between the set vehicle speed Vset and the curve-traveling speed Vcv, for example. The exit of the curve zone may be acquired from the map data.

The stop position of the curve-speed control may be shifted closer to the exit of the curve zone as the difference between the vehicle speed Vset and the curve-traveling speed Vcv increases. When the own vehicle reaches the stop position of the curve-speed control, the speed-recovery control may start to accelerate the own vehicle to an appropriate target value of the vehicle speed control in accordance with a behavior of the own vehicle with respect to the target traveling course, as described below.

The traveling state detector 103 may detect an attitude of the own vehicle with respect to the target traveling course to determine the traveling state of the own vehicle approaching the exit of the curve zone. In the example embodiment, the attitude of the own vehicle with respect to the target traveling course may include a lateral position and a yaw angle of the own vehicle with respect to the target traveling course.

Figure 2:
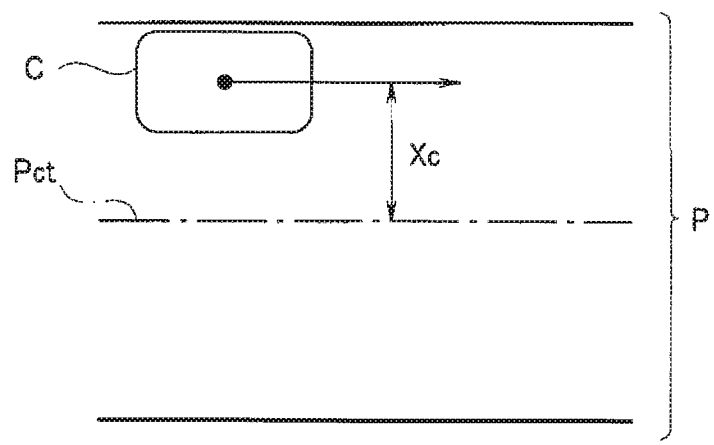
FIG. 2 is a diagram illustrating an example lateral position of an own vehicle with respect to a target traveling course.

For example, referring to FIG. 2, the traveling state detector 103 may detect a distance from a target traveling course Pct to the center of an own vehicle C along a width of a lane P, to determine a lateral position Xc of the own vehicle C with respect to the target traveling course Pct at a middle of the lane P. Additionally, referring to FIG. 3, the traveling state detector 103 may detect an angle defined between a longitudinal axis of the own vehicle C and the target traveling course Pct (i.e., tangent), to determine a yaw angle θy of the own vehicle C with respect to the target traveling course Pct.

Note that the lateral position Xc and the yaw angle θy may be detected on the basis of the map data, the position data on the position of the own vehicle, an approximate curve of the target traveling course based on the result of the recognition of the lane line, a measured yaw rate, and an estimated value based on the vehicle speed and the steering angle, for example.

Figure 3:
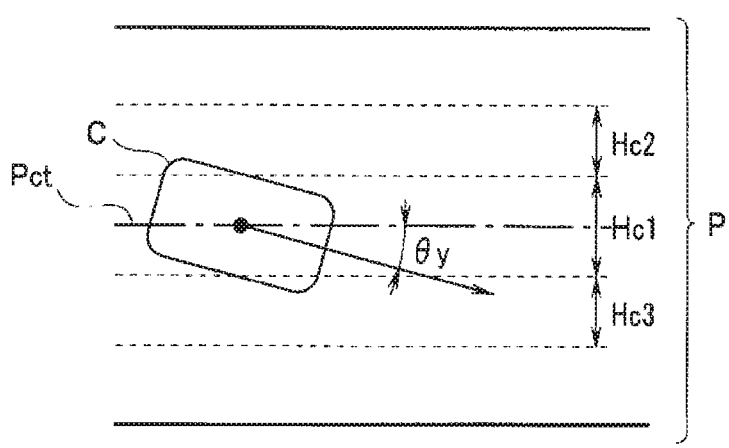
FIG. 3 is a diagram illustrating an example yaw angle of the own vehicle with respect to the target traveling course.
Figure 4:
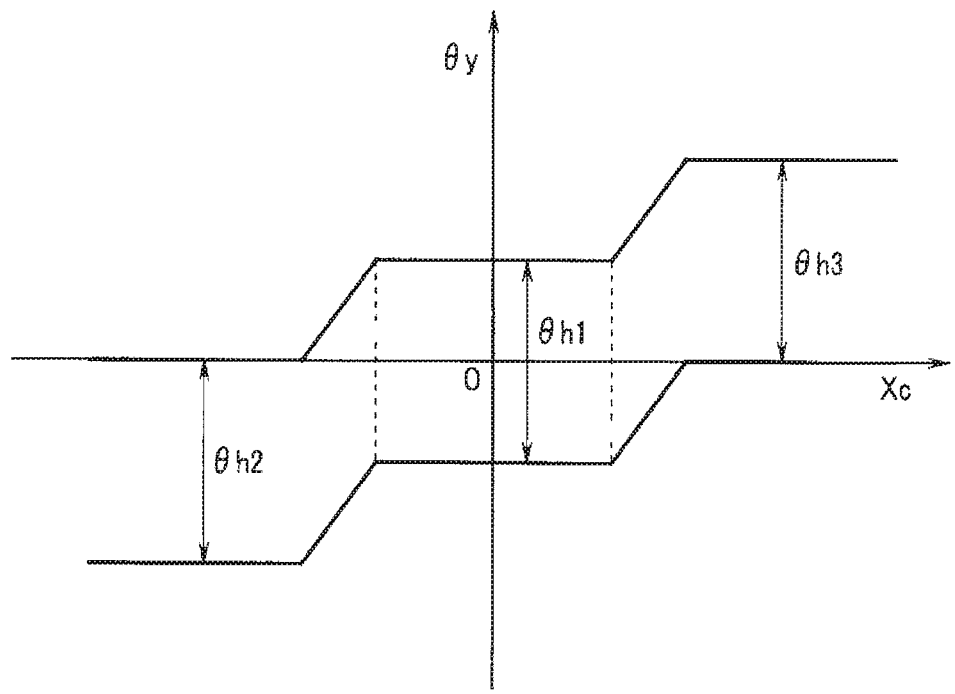
FIG. 4 is a diagram illustrating example regions defined by the yaw angle and the lateral position of the own vehicle.

The target value setter 104 may determine the target value of the vehicle speed control that starts to accelerate the own vehicle to the set vehicle speed Vset when the own vehicle approaches the exit of the curve zone. The target value of the vehicle speed control may be represented as a target acceleration rate αre or a target vehicle speed Vre in accordance with the traveling state or the behavior of the own vehicle with respect to the target traveling course. In the example embodiment, thresholds Hc1, Hc2, and Hc3 for the lateral position of the own vehicle may be determined as illustrated in FIG. 3, and thresholds θh1, θh2, and θh3 for the yaw angle of the own vehicle may be determined as illustrated in FIG. 4. The target acceleration rate αre or the target vehicle speed Vre may be determined for each regions defined by these thresholds.

For example, a yaw angle θy defined on the left side of the target traveling course Pct provided at a middle of the lane P along the traveling direction of the own vehicle C may be represented with a positive sign, whereas a lateral position Xc on the left side of the target traveling course Pct may be represented with a negative sign. In this example, the target value setter 104 may reduce the target acceleration rate αre or the target vehicle speed Vre as the lateral position Xc and the yaw angle θyz of the own vehicle C deviate from the regions defined by the thresholds Hc1, Hc2, and Hc3 illustrated in FIG. 3 and the thresholds θh1, θh2, and θh3 illustrated in FIG. 4.

The threshold θh1 may be a threshold yaw angle of the own vehicle positioning close to the middle of the lane. The threshold θh1 may be represented as a region within a relatively narrow range extending in the positive and negative directions with respect to the target traveling course Pct. Accordingly, even if the lateral position Xc of the own vehicle is close to the middle of the lane, the target acceleration rate αre or the target vehicle speed Vre may be reduced as the yaw angle θy deviates from the threshold θh1. This allows the own vehicle to moderately recover the set vehicle speed Vset. On the other hand, the target acceleration rate αre or the target vehicle speed Vre may be increased as the yaw angle θy becomes closer to the threshold θh1. This allows the own vehicle to relatively quickly recover the set vehicle speed Vset.

The threshold θh2 may be a threshold yaw angle of the own vehicle positioning close to the left side of the lane. The threshold θh2 may be relatively small in the left side of the lane from the negative range of the threshold θh1. In other words, the target acceleration rate αre or the target vehicle speed Vre may be reduced when the lateral position of the own vehicle is close to the left side of the lane. This suppresses a rapid change in attitude of the own vehicle moving toward the middle of the lane.

The threshold θh3 may be a threshold yaw angle of the own vehicle positioning close to the right side of the lane. The threshold θh3 may be relatively large in the right side of the lane from the positive range of the threshold θh1. In other words, as in a case of the threshold θh2, the target acceleration rate αre or the target vehicle speed Vre may be reduced when the lateral position Xc of the own vehicle is close to the right side of the lane. This suppresses a rapid change in attitude of the own vehicle moving toward the middle of the lane.

Note that the thresholds θh1, θh2, and θh3 may be varied in accordance with the curve-traveling speed Vcv or the difference between the curve-traveling speed Vcv and the set vehicle speed Vset, for example. As the curve-traveling speed Vcv increases, these thresholds θh1, θh2, and θh3 may become smaller, and the target acceleration rate αre and the target vehicle speed Vre may be reduced. This reduces a feeling of strangeness of the driver. Additionally, as the difference between the curve-traveling speed Vcv and the set vehicle speed Vset increases, these thresholds θh1, θh2, and θh3 may become smaller, and the target acceleration rate αre and the target vehicle speed Vre may be reduced. This reduces a feeling of strangeness of the driver.

Figure 5:
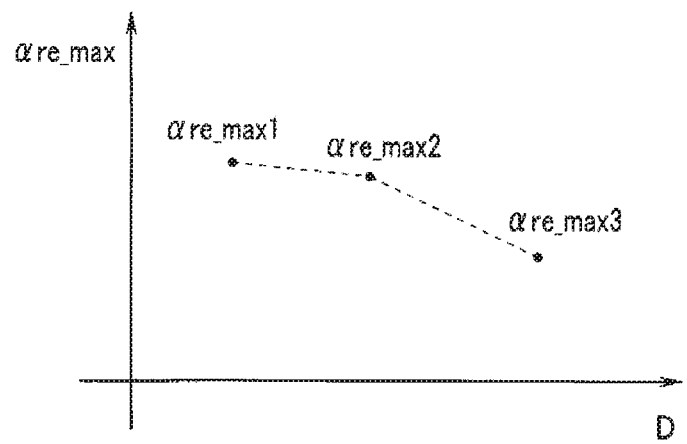
FIG. 5 is a graph illustrating example maximum target acceleration rates.

The target value of the vehicle speed control that accelerates the own vehicle may be determined for each region defined by the lateral position Xc and the yaw angle θy. In an example where the target value is represented as the target acceleration rate αre, a maximum target value αre_max may be reduced as the own vehicle deviates from the target traveling course, as illustrated in FIG. 5. This allows the own vehicle exhibiting an unstable behavior to be moderately accelerated to recover the set vehicle speed Vset.

FIG. 5 illustrates example maximum values αre_max of the target acceleration rate. The graph in FIG. 5 has a horizontal axis that indicates a distance D represented by the sum of squares of the lateral position Xc and the yaw angle θy. The distance D may correspond to a deviation of the own vehicle from the target traveling course. The maximum values αre_max of the target acceleration rate αre in FIG. 5 may include maximum values αre_max1, αre_max2, and αre_max3. The maximum value αre_max1 may correspond to a target value in a region defined by the thresholds Hc1 and θh1. The maximum value αre_max2 may correspond to a target value in a region defined by the thresholds Hc2 and θh2 and a region defined by the thresholds Hc3 and θh3. The maximum value αre_max3 may correspond to a target value in regions adjacent to the thresholds θh1, θh2, and θh3.

Figure 6:
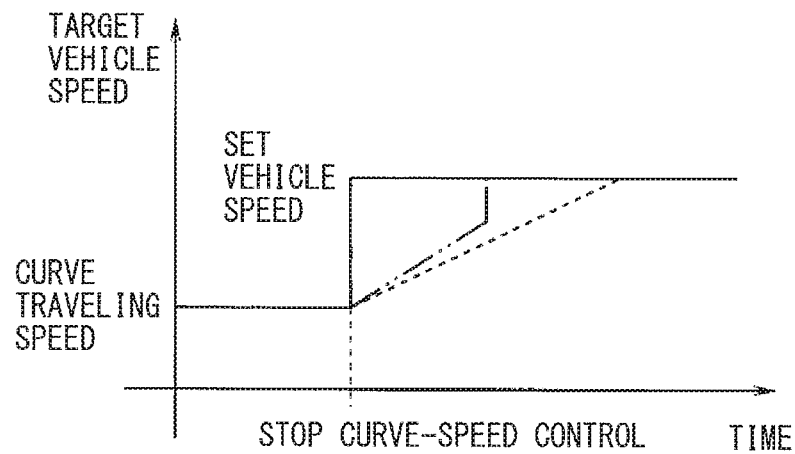
FIG. 6 is a graph illustrating an example transition of a target vehicle speed.

In another example where the target value of the vehicle speed control that accelerates the own vehicle is represented as the target vehicle speed Vre, the target vehicle speed Vre may be determined in accordance with the deviation of the own vehicle from the target traveling course (i.e., deviation between the actual course on which the own vehicle is traveling and the target traveling course), as illustrated in FIG. 6. In other words, when the deviation of the own vehicle from the target traveling course is small, the target value setter 104 may set the target vehicle speed Vre at the set vehicle speed Vset, as illustrated by a solid line in FIG. 6, for example. In contrast, when the deviation of the own vehicle from the target traveling course is large, the target value setter 104 may set the target vehicle speed Vre at a speed lower than the set vehicle speed Vset, as illustrated by a dash-line in FIG. 6. As illustrated by a two-dot chain line in FIG. 6, the target value setter 104 may set the target vehicle speed Vre at the set vehicle speed Vset when the behavior of the own vehicle becomes stable. This allows the traveling control apparatus 100 to achieve the vehicle speed control that moderately accelerates the own vehicle until the behavior of the own vehicle becomes stable with respect to the target traveling course while reducing a feeling of strangeness of the driver.

When the curve-end determiner 102 determines that the own vehicle has reached the start position of the speed-recovery control, the speed-recovery controller 105 may control the vehicle speed of the own vehicle using the target value determined by the target value setter 104 on the basis of the traveling state of the own vehicle. The own vehicle may thereby recover the set vehicle speed Vset. This allows the traveling control apparatus 100 to achieve the vehicle speed control that rapidly recover the set vehicle speed without causing a feeling of strangeness of the driver.

Figure 7:
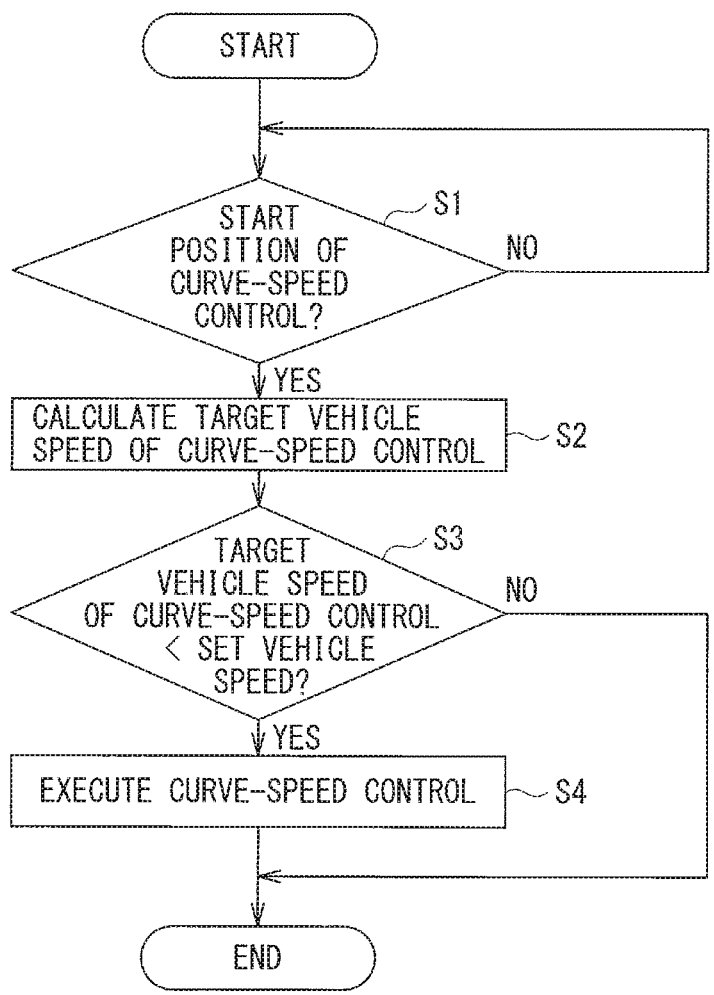
FIG. 7 is a flowchart illustrating an example curve-speed control.
Figure 8:
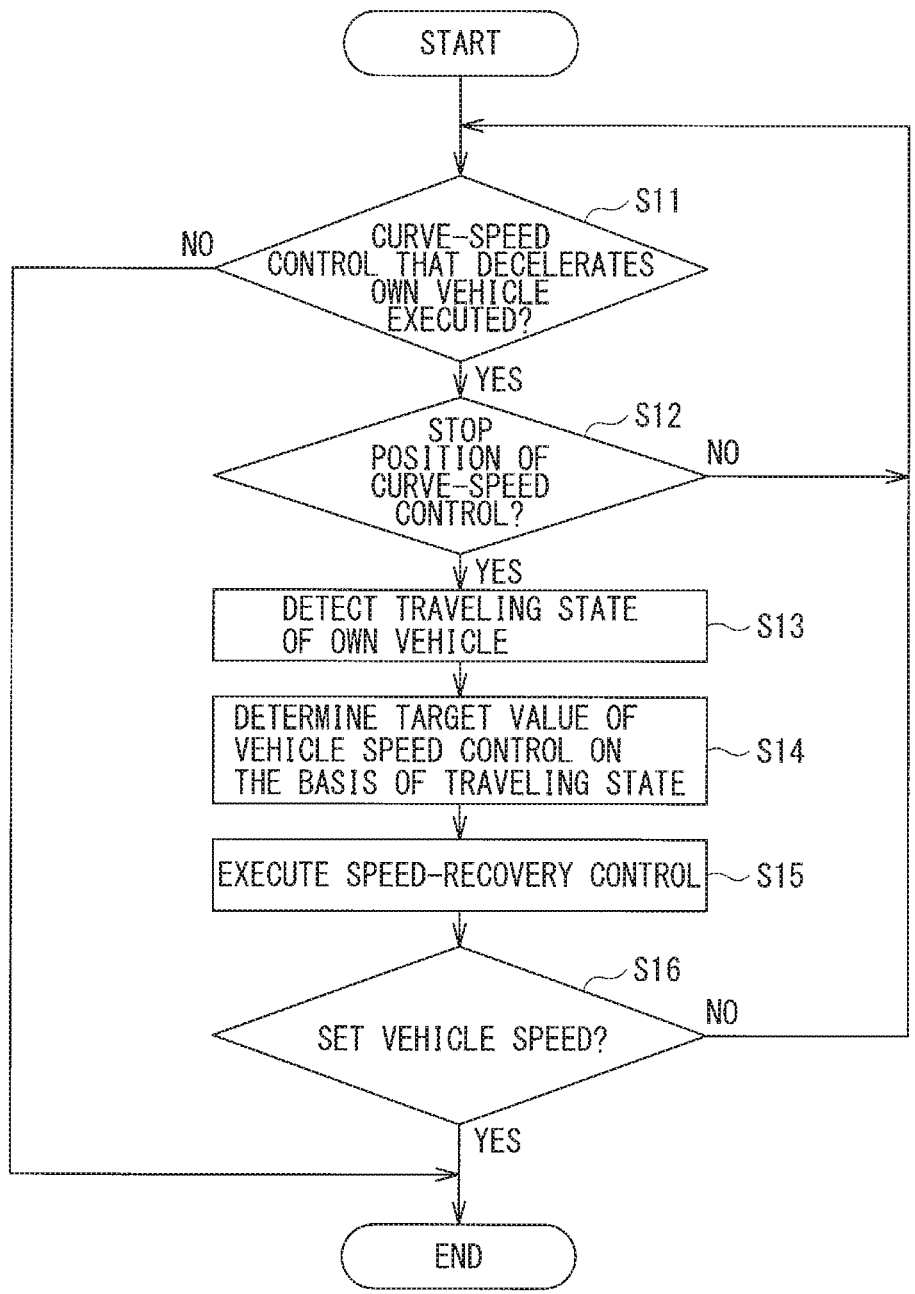
FIG. 8 is a flowchart illustrating an example speed-recovery control to recover a set vehicle speed.

Now described is a programmed procedure of the vehicle traveling control for the own vehicle automatically traveling in the curve zone along the target traveling course at the set vehicle speed Vset set by the driver, referring to FIGS. 7 and 8. FIG. 7 is a flowchart illustrating the curve-speed control executed by the traveling control apparatus 100. FIG. 8 is a flowchart illustrating the speed-recovery control for recovering the set vehicle speed Vset. The speed-recovery control may be performed by the traveling control apparatus 100.

The curve-speed control is described first referring to FIG. 7. In Step S1 of the curve-speed control, the curve-speed controller 101 may determine whether the own vehicle has reached a position at which the curve-speed control is to start (hereinafter referred to as "start position of the curve-speed control") when a curve zone is detected in front of the own vehicle on the basis of the map data, for example. The start position of the curve-speed control may be represented as a distance from an entrance of the curve zone. The distance may be determined on the basis of the radius of curvature of the curve zone and the vehicle speed of the own vehicle.

When the own vehicle has reached the start position of the curve-speed control ("YES" in Step S1), the procedure may proceed from Step S1 to Step S2. In Step S2, the curve-speed controller 101 may calculate an appropriate curve-traveling speed Vcv that meets the road conditions including the radius of curvature of the curve, and may set the curve-traveling speed Vcv as a target vehicle speed of the curve-speed control. Thereafter, in Step S3, the curve-speed controller 101 may determine whether the target vehicle speed Vcv is lower than the set vehicle speed Vset.

When the target vehicle speed Vcv of the curve-speed control is not lower than the set vehicle speed Vset ("NO" in Step S3), the curve-speed controller 101 may determine that the own vehicle does not need to be decelerated before entering the curve zone and that the own vehicle is able to travel through the curve zone while keeping the set vehicle speed Vset. In this case, the procedure may exit the routine. In contrast, when the target vehicle speed Vcv is lower than the set vehicle speed Vset ("YES" in Step S3), the curve-speed controller 101 may determine that the own vehicle needs to be decelerated before entering the curve zone. In this case, the procedure may proceed from Step S3 to Step S4. In Step S4, the curve-speed controller 101 may execute the curve-speed control. The curve-speed control may decelerate the own vehicle to the target vehicle speed Vcv before entering the curve zone, and causes the own vehicle to run at the target vehicle speed Vcv in the curve zone.

The speed-recovery control that causes the own vehicle to recover the set vehicle speed Vset will now be described referring to FIG. 8. In Step S11 of the speed-recovery control, the traveling control apparatus 100 may determine whether the curve-speed control that decelerates the own vehicle is executed. When the curve-speed control (i.e., deceleration control) is not executed ("NO" in Step S11), the procedure may exit the routine. When the curve-speed control is executed ("YES" in Step S11), the procedure may proceed from Step S11 to Step S12.

In Step S12, the curve-end determiner 102 may determine whether the own vehicle has approached the exit of the curve zone and reached the stop position of the curve-speed control. When the own vehicle has not reached the stop position of the curve-speed control yet ("NO" in Step S12), the procedure may return to Step S11, and the curve-speed control may be kept performed until the own vehicle reaches at the stop position of the curve-speed control. When the own vehicle has reached the stop position of the curve-speed control ("YES" in Step S12), the procedure may proceed from Step S12 to Step S13. In Step S13, the traveling state detector 103 may detect the lateral position Xc and the yaw angle θy of the own vehicle with respect to the target traveling course, to determine a traveling state of the own vehicle traveling on the curve zone.

Thereafter, in Step S14, the target value setter 104 may determine the target value of the vehicle speed control that starts to accelerate the own vehicle traveling in the curve zone to recover the set vehicle speed Vset set before the own vehicle enters the curve zone. The target value of the vehicle speed control may be determined on the basis of the traveling state of the own vehicle (i.e., the lateral position Xc and the yaw angle θy of the own vehicle with respect to the target traveling course). As described above, the target value of the vehicle speed control that accelerates the own vehicle may be represented as the target acceleration rate αre or the target vehicle speed Vre. The target acceleration rate αre or the target vehicle speed Vre may be reduced as the deviation of the own vehicle from the target traveling course increases.

After the target acceleration rate αre or the target vehicle speed Vre is determined in Step S14, the speed-recovery controller 105 may execute, in Step S15, the speed-recovery control to accelerate the own vehicle traveling in the curve zone at the decelerated speed to the set vehicle speed Vset. Thereafter, in Step S16, the traveling control apparatus 100 may determine whether the vehicle speed of the own vehicle has reached the set vehicle speed Vset. When the vehicle speed of the own vehicle has not reached the set vehicle speed Vset yet ("NO" in Step S16), the procedure may return to Step S11. Thereafter, the traveling state of the own vehicle may be detected again, and the subsequent steps described above may be repeated. When the speed of the own vehicle has reached the set vehicle speed Vset ("YES" in Step S16), the procedure may be terminated.

As described in the foregoing example embodiment, when a curve zone is detected while the own vehicle is traveling along the target traveling course at the set vehicle speed set by the driver, the own vehicle may be decelerated to an appropriate curve-traveling speed before entering the curve zone. Additionally, the target value of the vehicle speed control that starts to accelerate the own vehicle when the own vehicle approaches the exit of the curve zone may be determined. The target value may be determined on the basis of the lateral position and the yaw angle of the own vehicle with respect to the target traveling course. Accordingly, it is possible to recover the vehicle speed with an appropriate speed transition in accordance with the behavior of the own vehicle and without causing a feeling of strangeness of the driver.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The traveling control apparatus 100 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the traveling control apparatus 100. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the traveling control apparatus 100 illustrated in FIG. 1.

The invention claimed is:
1. A vehicle traveling control apparatus comprising:
a traveling controller configured to determine a target traveling course on which an own vehicle is to travel;
a traveling state detector configured to detect yaw angle of an own vehicle when the own vehicle traveling in a curve zone and decelerated to a curve-traveling speed approaches an exit of the curve zone, the curve-traveling speed being a speed at which the own vehicle is to travel in the curve zone, the detected yaw angle being an angle defined between a longitudinal axis of the own vehicle and the target traveling course; and
a target value setter configured to determine at least one of a target acceleration rate and a target vehicle speed of a vehicle speed control based on at least the detected yaw angle, the vehicle speed control starting to accelerate the own vehicle when the own vehicle approaches the exit of the curve zone.

2. The vehicle traveling control apparatus according to claim 1, wherein the traveling state detector further detects a lateral position of the own vehicle,
   wherein the detected lateral position of the own vehicle is a distance from the target traveling course to a predetermined point of the own vehicle, and
   wherein the target value setter is configured to determine at least the one of the target acceleration rate and the target vehicle speed based on at least the detected lateral position and the detected yaw angle.

3. The vehicle traveling control apparatus according to claim 2, wherein the target value setter determines the target value by comparing the lateral position of the own vehicle detected by the traveling state detector with a first threshold, and comparing the yaw angle of the own vehicle detected by the traveling state detector with a second threshold.

4. The vehicle traveling control apparatus according to claim 3, wherein the target value setter determines the second threshold in accordance with the lateral position.

5. The vehicle traveling control apparatus according to claim 2, wherein the target value setter reduces at least one of the target acceleration rate or the target vehicle speed in accordance with at least one of the detected lateral position and the detected yaw angle increasing.

6. The vehicle traveling control apparatus according to claim 3, wherein the target value setter reduces at least one of the target acceleration rate or the target vehicle speed in accordance with at least one of the detected lateral position and the detected yaw angle increasing.

7. The vehicle traveling control apparatus according to claim 4, wherein the target value setter reduces at least one of the target acceleration rate or the target vehicle speed in accordance with at least one of the detected lateral position and the detected yaw angle increasing.

8. The vehicle traveling control apparatus according to claim 2, wherein the target traveling course comprises a middle of a lane on which the own vehicle is traveling.

9. The vehicle traveling control apparatus according to claim 3, wherein the target traveling course comprises a middle of a lane on which the own vehicle is traveling.

10. The vehicle traveling control apparatus according to claim 4, wherein the target traveling course comprises a middle of a lane on which the own vehicle is traveling.

11. A vehicle traveling control apparatus comprising circuitry configured to
    determine a target traveling course on which an own vehicle is to travel,
    detect a yaw angle of an own vehicle when the own vehicle traveling in a curve zone and decelerated to a curve-traveling speed approaches an exit of the curve zone, the curve-traveling speed being a speed at which the own vehicle is to travel in the curve zone, the detected yaw angle being an angle defined between a longitudinal axis of the own vehicle and the target traveling course, and
    determine at least one of a target acceleration rate and a target vehicle speed of a vehicle speed control based on at least the detected yaw angle, the vehicle speed control starting to accelerate the own vehicle when the own vehicle approaches the exit of the curve zone.

12. The vehicle traveling control apparatus according to claim 11,
    wherein the circuitry is further configured to
      detect a lateral position of the own vehicle, and
      determine at least one of the target acceleration rate and the target vehicle speed based on at least the detected lateral position and the detected yaw angle,
    wherein the detected lateral position of the own vehicle is a distance from the target traveling course to a predetermined point of the own vehicle.

13. The vehicle traveling control apparatus according to claim 12, wherein the circuitry is configured to reduce at least one of the target acceleration rate and the target vehicle speed in accordance with at least one of the detected lateral position and the detected yaw angle increasing.

* * * * *